Nov. 15, 1966  G. F. SCHMITZ  3,285,082
MECHANICAL ACTUATOR
Filed Aug. 12, 1964
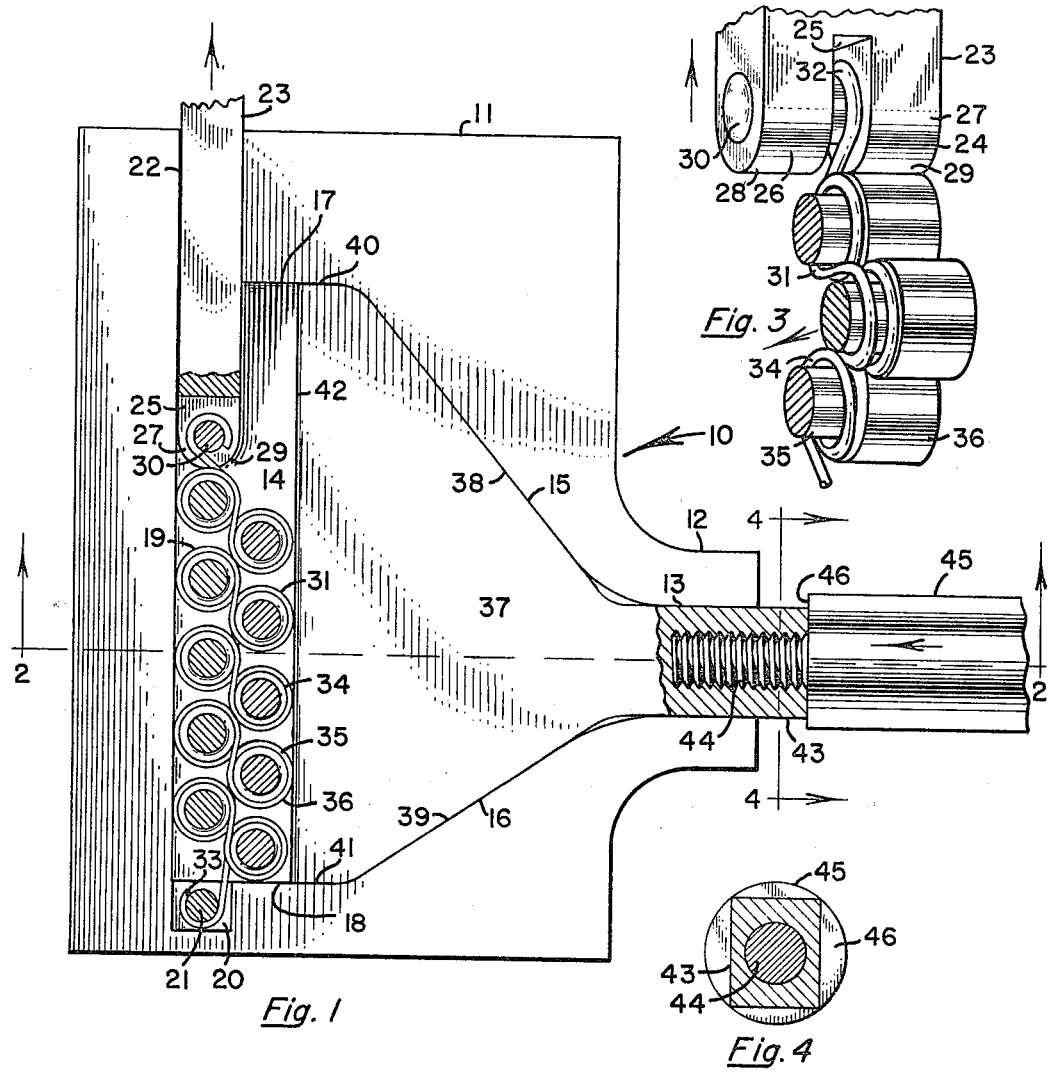
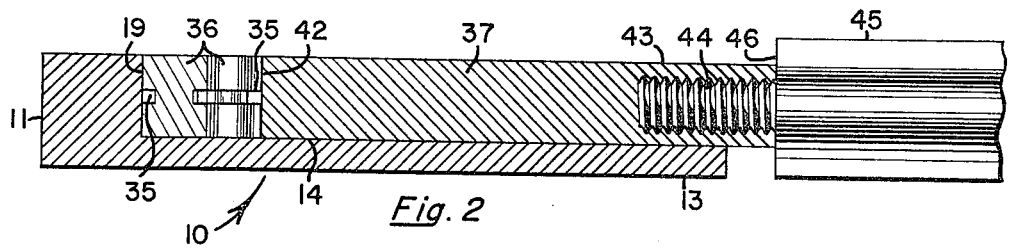
Gert F. Schmitz INVENTOR.
BY *[signature]*
ATTORNEY

United States Patent Office 3,285,082
Patented Nov. 15, 1966

3,285,082
MECHANICAL ACTUATOR
Gert F. Schmitz, Huntsville, Ala., assignor to Thiokol Chemical Corporation, Bristol, Pa., a corporation of Delaware
Filed Aug. 12, 1964, Ser. No. 389,132
2 Claims. (Cl. 74—110)

This invention relates to improvements in mechanical actutators and, more particularly, to those that are adapted for use with rocket motors wherein maximum movement is desired with the least amount of effort.

Mechanical actuators can be employed for many functions in rocket motors, moving control surfaces, operating valves, as well as many other component parts that require actuation during preflight or flight of the rocket motor. It is a well-known fact, however, that an actuator is dead weight as far as the rocket motor is concerned; and since the weight is non-propulsive, however necessary the mechanical actuator may be, its weight is significant in the flight of the rocket motor. It is apparent, therefore, that mechanical actuators that are suitable for use where weight is not involved are not suitable for use with rocket motors.

It is of vital importance that all excess weight be eliminated from rocket motors; therefore, the weight of any mechanical actuator that is to be incorporated into the rocket motor must be as compact as possible and its weight must be reduced to a minimum. It is also desirable that the mechanical actuator be as simple as possible to prevent any chance of the malfunction thereof.

Another important characteristic the mechanical actuator must possess is the ability to produce the largest amount of work output from the least available power input. It is apparent, therefore, that however small and light a mechanical actuator is, if it requires a large power input, it may not be as efficient as a somewhat larger and heavier mechanical actuator that is more efficient in that it requires a less amount of power input.

It is, therefore, an object of the present invention to provide a mechanical actuator that will produce a large work output from a limited amount of power input.

It is another object of the present invention to provide a mechanical actuator that is compact, light in weight, efficient in operation and simple in construction.

With the above and other objects and advantages in view, the invention consists of the novel details of construction, arrangement and combination of parts more fully hereinafter described, claimed and illustrated in the accompanying drawing in which:

FIGURE 1 is an elevational view, partly in section and partly broken away, of a mechanical actuator embodying the invention.

FIGURE 2 is a longitudinal, sectional view, partly in elevation, on the line 2—2 of FIGURE 1.

FIGURE 3 is an enlarged detailed fragmentary view, partly in elevation and partly in section, showing the manner in which the biasing spring cooperates with the actuating rollers, and FIGURE 4 is a vertical sectional view on the line 4—4 of FIGURE 1.

Referring more in detail to the drawing wherein like parts are designated by like reference numerals, the reference numeral 10 is used to generally designate a mechanical actuator embodying the invention.

The mechanical actuator 10 comprises a housing 11 which may be of any size or shape having formed integral therewith and extending from one side thereof a bearing boss 12 that is provided with a centrally located smooth bore 13 which communicates with an internal cavity or working chamber 14.

The cavity or working chamber 14 is somewhat triangular in cross-section, having two converging side portions 15 and 16 that terminate in straight parallel side portions 17 and 18 that terminate in a straight base portion 19. There is provided in the housing 11 a small cavity 20 that communicates with the cavity or working chamber 14.

One edge of the cavity 20 is contiguous with the base portion 19 of the cavity; and an anchoring pin 21 is secured in the cavity 20 so that the longitudinal axis thereof extends transversely of the housing 11.

Positioned in the housing 11 in diametrically-opposed relation to the cavity 20 is a channel 22; and one edge thereof is contiguous with the base portion 19 of the cavity or working chamber 14.

Mounted for sliding movement in the channel 22 is a power output actuating shaft or rod 23 that is provided with a bifurcated end 24, FIGURE 3, that provides therein a slot 25 defined by end portions 26 and 27 having rounded edge portions 28 and 29. Extending transversely of the bifurcated end 24 and the slot 25 is an anchoring pin 30 that is rigidly secured at its opposite ends in the end portions 26 and 27.

A coiled biasing spring 31 extends between the anchoring pins 21 and 30 having a coiled end 32 extended around the anchoring pin 30 and a coiled end 33 extended around the anchoring pin 21.

Each coil 34 of the spring 31 is entwined around and within an annular groove 35 of a roller 36; and there is a roller 36 disposed in each coil 34 of the spring 31. The coils 34 are sufficiently loose to permit the rollers 36 to be moved laterally into a straight line that will extend between the anchoring pins 21 and 30 and be contiguous with the base 19 of the cavity or working chamber 14.

Mounted for reciprocal sliding movement within the cavity or working chamber 14 is a piston 37; and the shape thereof conforms in some respects to the shape of the cavity or working chamber 14. The piston 37 is substantially triangular in shape having converging side portions 38 and 39 that coincide with and will, when the piston 37 is at rest, contact the side portions 15 and 16 of the cavity or working chamber 14. The converging side portions 38 and 39 of the piston 37 terminate in straight parallel side portions 40 and 41 that have sliding engagement with the straight side portions 17 and 18 of the cavity or working chamber 14. The side portions 40 and 41 terminate in a straight base portion 42 that confronts and, when in operation, will engage the rollers 36.

The converging side portions 38 and 39 of the piston 37 converge into and become part of an internally-threaded circular piston rod connecting stud 43 to which is connected the externally-reduced threaded end portion 44 of a piston rod 45 which is of greater diameter than the bore 13 so that the rod 45 defines a circular shoulder 46 at the inner terminal end of the threaded end portion 44 that will abut the outer end of the boss 12 to limit inward movement of the piston 37 within the cavity or working chamber 14.

The mechanical actuator 10 is adapted to be used in lieu of a linkage or locking arrangement or as a combination of both. Basically, the mechanical actuator 10 consists of the housing 11, actuator rod 23, the rollers 36 which may be said to constitute a roller column, and a piston 37 that is actuated by a piston rod 45. Any conventional type of power source may be connected to the piston rod 45, and the actuating rod 23 may be connected to many components, such as a gas generator for an igniter for a rocket motor, a gas valve for a vectoring system for a rocket motor, directional vanes for a rocket motor and many other components of a rocket motor that require the mechanical actuation thereof.

In the operation of the mechanical actuator 10, when input power is applied to the piston rod 45, it will move the piston 37 against the rollers 36 to force them into a column that will extend between the anchor pins 21 and 30. This action will force the actuator rod 23 outwardly of the housing 11 to actuate whatever component is connected thereto. The shoulder 46 will limit the inward movement of the piston 37 so that the rollers 36 will not be forced into locking position in relation to each other. When the piston rod 45 is retracted, the biasing spring 31 will return the rollers to rest, as shown in FIGURE 1. Thus, a short input movement of the piston 37 will provide a long output movement of the actuating rod 23 depending upon the number of rollers 36 that are incorporated into the mechanical actuator 10. While a high output is obtained as the rollers 36 are moved into columnar relation to each other, the output force will reach a zero point; and at this point, the actuating rod 23 can be retained in extended position with very little power input because of the very high power amplification of the roller column.

No pivots and long linkage are needed to increase the power output of the mechanical actuator 10, and the provision of the roller column permits equal forces to be transferred in a small compact unit. As previously stated, the travel ratio between the input and output forces of the mechanical actuator can be altered by changing the number of the rollers 36.

It will be understood that a cover, though not illustrated, may be secured to the housing 11 to completely inclose the working elements of the mechanical actuator 10.

The actuator rod 23 is substantially rectangular in shape to prevent any rotation thereof that would cause it to move out of alignment with the rollers 36; and the rounded edges of the bifurcated end of the actuator rod 23 that makes contact with the next adjacent roller 36 are of the same radius as the rollers 36 to provide smooth and efficient action between the actuating rod 23 and the next adjacent roller 36.

The spring 31 is coiled so that it will go under tension when stretched by the movement of the rollers 36; and when the piston 37 is retracted, the spring 31 will bias all of the rollers to their rest position, as shown in FIGURE 1.

As previously described, all parts of the mechanical actuator 10, will be assembled before a cover is applied thereto, and the cover can be removed when it is necessary to repair or replace any of the parts of the mechanical actuator.

It is believed, therefore, that, from the foregoing description, the manner of operation and the construction of the mechanical actuator will be clear to those skilled in the art; and it is to be understood that variations in the manner of operation or the construction thereof may be adhered to providing such variations fall within the spirit of the invention and the scope of the appended claims.

Having thus described the invention, what is claimed as new and desired to be secured by Letters Patent is:

1. A mechanical actuator comprising a housing having a cavity therein, a piston mounted for reciprocating movement within said cavity, an actuating rod mounted in said housing in perpendicular relation to the path of movement of said piston with one end thereof extending into said cavity, a plurality of rollers, each having an annular groove therein, mounted in said housing and confronting said piston, a coiled biasing spring mounted in said housing, each coil of said spring engaging the annular groove in each of said rollers, said rollers adapted to be moved into columnar relation to each other by said piston whereby said rollers are moved from a rest position into an active position to engage and actuate said rod outwardly of said housing, and whereby upon release of said piston from engagement with said rollers, said spring will return said rollers to their rest position.

2. A mechanical actuator, as in claim 1, wherein one end of said spring is connected to one end of said actuating rod and the other end of said spring is anchored in said housing, a piston rod is connected to said piston and said rod is provided with a shoulder that is adapted to engage said housing to limit the inward movement of said piston to prevent said rollers from becoming locked into immobile relation to each other.

References Cited by the Examiner
UNITED STATES PATENTS

| | | | |
|---|---|---|---|
| 2,394,676 | 2/1946 | Finn | 74—110 |
| 3,009,723 | 11/1961 | Patrignani | 74—89 X |
| 3,101,233 | 8/1963 | McNaney | 74—110 X |
| 3,154,700 | 10/1964 | McNaney | 310—8.3 |

FRED C. MATTERN, Jr., *Primary Examiner.*

F. E. BAKER, *Assistant Examiner.*

MILTON KAUFMAN, *Examiner.*